United States Patent [19]

Roberts

[11] Patent Number: 5,005,009
[45] Date of Patent: Apr. 2, 1991

[54] METHOD AND APPARATUS FOR MULTIPLE OBJECT VIEWING

[75] Inventor: John K. Roberts, Camp Pendleton, Calif.

[73] Assignee: K. W. Muth Company, Inc., Sheboygan, Wis.

[21] Appl. No.: 310,644

[22] Filed: Feb. 15, 1989

Related U.S. Application Data

[63] Continuation-in-part of Ser. No. 156,122, Feb. 16, 1988, abandoned.

[51] Int. Cl.$^5$ ............................................. G02B 27/16
[52] U.S. Cl. ................................... 340/705; 340/980; 350/174
[58] Field of Search ............... 340/705, 980, 945, 947, 340/948; 350/174

[56]  References Cited

U.S. PATENT DOCUMENTS

| | | |
|---|---|---|
| 3,163,949 | 1/1965 | Gley . |
| 3,230,819 | 1/1966 | Noxon . |
| 3,317,906 | 5/1967 | Baldridge . |
| 3,574,283 | 4/1971 | Alberts . |
| 3,829,196 | 8/1974 | Deb . |
| 3,881,809 | 5/1975 | Fergason et al. . |
| 3,887,273 | 6/1975 | Griffiths . |
| 3,915,548 | 10/1975 | Opittek . |
| 4,190,832 | 2/1980 | Mohler . |
| 4,398,799 | 8/1983 | Swift ..................... 340/705 |
| 4,449,024 | 5/1984 | Stracener . |
| 4,560,233 | 12/1985 | Banbury . |
| 4,635,033 | 1/1987 | Inukai . |
| 4,636,782 | 1/1987 | Nakamura et al. .................. 340/705 |
| 4,740,780 | 4/1988 | Brown et al. . |
| 4,742,389 | 5/1988 | Schiffman . |
| 4,768,300 | 9/1988 | Rutili . |
| 4,795,223 | 1/1989 | Moss . |
| 4,831,366 | 5/1989 | Iino . |
| 4,840,465 | 6/1989 | Loy et al. ............................ 350/174 |

FOREIGN PATENT DOCUMENTS

| | | |
|---|---|---|
| 0216014 | 4/1987 | European Pat. Off. . |
| 0216692 | 4/1987 | European Pat. Off. . |
| 0088925 | 5/1985 | Japan ................................. 340/705 |
| 61-12450 | 1/1986 | Japan . |
| 2154021 | 8/1985 | United Kingdom ................ 340/705 |

Primary Examiner—John B. Sotomayor
Attorney, Agent, or Firm—Godfrey & Kahn

[57]  ABSTRACT

A heads-up display for moving vehicles such as an airplane or automobile and which includes a transparent sheet which may be the windscreen or windshield of the vehicle. An extremely thin enhancing film is secured in intimate contact with the transparent sheet and disposed within the sheet, if it is a laminated sheet such as a safety glass sheet or on that side of the sheet which is on the interior of the vehicle, or which may be made integral with the composition which makes up the transparent sheet. The enhancing film is an absorber or blocker of selected lightwaves which match the lightwaves of a display of indicia projected against the interior side of the windscreen. The assembly of film in sheet eliminates the need for a separate, independent indicia reflector to replace between the windscreen and the operator of the vehicle.

23 Claims, 2 Drawing Sheets

METHOD AND APPARATUS FOR MULTIPLE OBJECT VIEWING

This patent application is a continuation-in-part of U.S. patent application Ser. No. 07/156,122 which was filed on Feb. 16, 1988 now abandoned.

BACKGROUND OF THE INVENTION

1. Field of the Invention

The present invention relates to an instrument display apparatus and more particularly to such a device which is adapted to produce a reflected image of an instrument in a windscreen or other similar assembly such that an operator may view same while simultaneously viewing out through the windscreen.

2. Description of the Prior Art

The development of a head-up display (HUD) is relatively new and probably had its genesis in the military aircraft field. As should be understood and in the operation of high-speed aircraft, traveling in excess of the speed of sound, and particularly aircraft designed for combat maneuvering, it is extremely hazardous for the pilot to divert his attention from a point of interest in the vicinity of the aircraft to read the dials, gauges, instruments, warning indicators, etc., on the assorted instrument panels which are located in various positions about the cockpit but below his normal line of sight.

More recently this same problem has been recognized in the field of high speed motor car operation. Further, experts have speculated that this same technology could perhaps be helpful in the day to day driving activities of the average motorist.

In any vehicle application, however, one will recognize that employment of a HUD will enhance the safe operation of same because a HUD permits the operator of the vehicle to view, directly in his line of sight, critical instrumentation displays such as speed, fuel consumption, oil pressure, etc., without diverting his eyes from the area immediately in front of the vehicle.

The prior art is replete with numerous examples of heads up display devices. For example heads up display systems have been disclosed in several U.S. patents, particularly Steward U.S. Pat. No. 4,652,870; Banbury U.S. Pat. No. 4,560,233; Spooner U.S. Pat. No. 4,347,508; and Garner U.S. Pat. No. 4,453,163. Further the references cited in these same U.S. patents are pertinent but not as critical or relevant as are the above four patents to the instrument display apparatus of the present invention.

As interesting as the prior art may be, none of these references teaches or suggests the method and apparatus of the present invention wherein a substantially transparent windscreen is borne by an overland vehicle and which includes a predetermined tint field which attenuates preselected wavelength of light and which provides unrestricted viewing in all directions and which is combined with an instrument which is displayed adjacent to the windscreen and which produces light in the selected wavelengths which are attenuated by the tint field whereby the image of the instrument appears within the tint field.

OBJECTS OF THE INVENTION

It is, therefore, a principle object of the present invention to provide an instrument display apparatus which can be mounted in all manner of overland vehicles, watercraft, aircraft or the like without introducing any additional extraneous and/or dangerous objects between the vehicle operator and the windscreen.

A further object of the present invention is to provide an instrument display apparatus which can be directly controlled either manually or automatically, relative to the ambient lighting and weather conditions thereby providing a reflected image which is clear and distinct.

Another object of the present invention is to provide an instrument display apparatus which is operable to fit into existing overland vehicle construction.

Another object of the present invention is to provide an instrument display apparatus which provides a substantially ghost-free image.

Another object of the present invention is to provide an instrument display apparatus which absorbs, blocks, or attenuates secondary reflected light waves which lie in the red/orange band.

Another object of the present invention is to provide an instrument display apparatus which operates effectively regardless of the rake or slant of the windscreen and which, furthermore, can provide beneficial results in providing a screen against external interference, such as bright sunlight, the bright lights of oncoming vehicles, etc.

Another object of the present invention is to provide an instrument display apparatus which may be manufactured as an integral component of an overland vehicle or which further can be manufactured in the manner of a retrofit.

Another object of the present invention is to provide an instrument display apparatus which is characterized by ease of installation, simplicity of construction, and which further can be sold at a relatively nominal price when compared with related prior art devices.

Another object of the present invention is to provide an instrument display apparatus which is easily accessible for maintenance modification or the like.

Another object of the present invention is to provide an instrument display apparatus which is operable to obtain the individual benefits to be derived from related prior art devices while avoiding the detriments individually associated therewith.

Further objects and advantages are to provide improved elements and arrangements thereof in an instrument display apparatus for the purposes described which is dependable, economical, durable, and fully effective in accomplishing its intended purposes.

These and other objects and advantages are achieved in an instrument display apparatus which includes a substantially transparent panel having a predetermined tint field which attenuates preselected wavelengths of light, and which provides unrestricted viewing in all directions, the tint field attenuating light which strikes the transparent panel in all directions, and an instrument to be displayed positioned adjacent to the transparent panel and which is adapted to produce light in the selected wavelengths which are attenuated by the tint field whereby the image of the instrument appears within the tint field.

SUMMARY OF THE INVENTION

In the present invention a film, coating or emulsion forming a predetermined tint field is placed within (or against, or in intimate contact with, or made integral with) the surface or structure of a windshield or windscreen in such a manner and a position such that data in the form of visual indicia to be noted by the operator of the vehicle can be exhibited directly on the innermost surface of the windscreen, under enhanced or improved optical conditions, and without interfering with the operator's line of sight through the windscreen and, therefore, permitting the simultaneous observation, by the operator, of the environment on the outside of the vehicle as well as the characteristics of the visual data to be observed on the innermost surface of the windscreen.

As should be understood the enhancing film which forms the tint field of the present invention is an absorption filter which may be made integral with the composition which makes up the windscreen or which may be sandwiched between two lamina of the windscreen, (similar to or as a part of the "safety glass" feature thereof), or which further may be placed or fixed on the innermost facing surface of the windscreen. Further, a windscreen incorporating the above-mentioned tint field can be provided inexpensively as a part of the standard equipment of the vehicle; can be supplied as a separate option; can be easily replaced and/or repaired along with a replacement windscreen if the windscreen is damaged; and is not effected by abrasion of foreign particles striking the exterior surface of the windscreen.

With the above objects in view, and with a general comprehension of the invention, further information and a better understanding of the present invention may be achieved by referring to the following detailed description.

DETAILED DESCRIPTION

For the purpose of illustrating the present invention, there is shown in the accompanying drawings a form thereof which is at present preferred, although it is to be understood that the various instrumentalities of which the invention consists can be variously arranged and organized, and that the invention is not limited to the precise arrangement and organizations of the instrumentalities as shown and described herein.

In the drawings, and wherein like reference characters indicate like parts:

Figure 1:
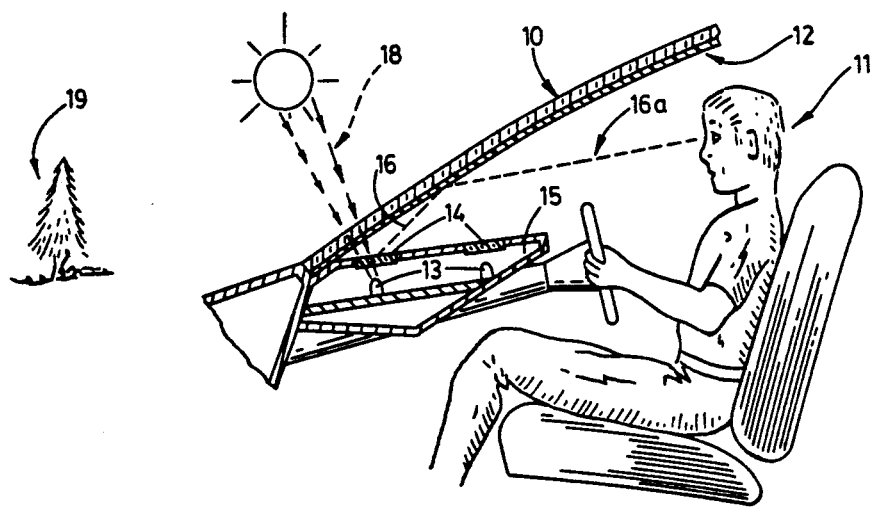
FIG. 1 is a partial, longitudinal, sectional view of the passenger compartment of a vehicle and which illustrates how an operator of the overland vehicle may view simultaneously both the external environment as well as the reflections of the visual indicia placed in front of him within the vehicle.

Referring more particularly to FIG. 1, there is shown at numeral 10 a windshield, windscreen, window, viewport, or any other transparent sheet through which a surrounding environment may be viewed and which may include the windshield of an automobile or other overland vehicle, or the windscreen of an aircraft, etc. The windscreen 10 may be composed of glass, plastic, polycarbonate, acrylic, crystal, mineral, or any other transparent material, either tinted or neutral. Although conceivably principle application for the present invention would be for use in aircraft or automobile windshields or windscreens, it is also possible to apply these same teachings to a side or rear window, or employ same on other vehicles, such as motorcycles. Similarly, the present invention can also be used in other applications such as bank tellers booths, control booths, ticket selling booths, etc. As should be understood, the windscreen employed in the present invention, apart from the predetermined tint field 12 which will be made integral therewith and which will be discussed in greater detail hereinafter, is of conventional design. That is, the windscreen permits substantially unrestricted viewing of the exterior environment from various positions relative to the windscreen by the operator 11 of the overland vehicle.

The present invention includes an enhancing film or predetermined tint field 12 which is made integral with the windscreen 10 and which may include a layer of transparent polymeric material, glass, mineral, emulsion, tinting or other coating, including those with metallic additives, applied in molten form, solution, or rolling adhesive, and which is fixed by these assorted means of attachment directly to the inner surface of the windshield 10 or sandwiched between the two glass layers of safety glass or made integral with the composition which makes up the windshield 10 as by being dispersed or suspended in the lattice structure thereof. As should be understood the predetermined tint field is specifically not disposed in the space between the operator or observer 11 and the windscreen 10.

The enhancing film or predetermined tint field 12 which operates as an absorption filter, incorporates any selected absorption phenomena which permits a primary reflection which is more powerful than any secondary reflection or image cast against the windscreen 10. More particularly, the enhancing film or predetermined tilt field, in general, is operable to absorb or attenuate predetermined frequencies of light which originate from diverse locations, directions, and angles, including the environment exterior to the vehicle or light which may be emitted or reflected from an instrument 14. Further it should be understood that this selective absorption of predetermined wavelengths which originates from the exterior environment operates to enhance the primary reflected image by greatly improving the contrast of the primary reflected image relative to the background lighting conditions. In addition to the foregoing, the predetermined tint field does not inhibit or otherwise restrict in any fashion, the operator's directional view through the windscreen, that is, the operator 11 has unrestricted viewing through the windscreen regardless of his position. Further, the primary reflected image produced in the predetermined tint field as a result of the teachings of the present invention may be seen from any position in the overland vehicle thereby greatly facilitating its utility.

An object or instrument to be reflected 14 by the enhancing film or predetermined tint field 12 on the innermost facing surface of the windscreen 10 to produce the aforementioned heads up image may be any gauge, dial, cathode ray tube, switch, knob, indicator, etc., which discloses a level, or condition which may be visually observed by the operator 11. Examples of instrument clusters or other displays include speedometers, RPM indicators, temperature gauges, pressure, voltage, or amperage indicators, air speed indicators, compasses, altitude indicators, fuel level indicators, radio frequency indicators, volume level indicators, and status lights for environmental and/or weapons controls, clocks, malfunctions, etc. The instrument display or cluster and which is indicated by the numeral 14 in FIG. 1 may be artificially illuminated by any back, side, or front lights 13 which operate to augment, supplement or enhance the reflected ambient light 18. This artificial lighting 13 may be of several types including incandescent, fluorescent, arc discharge (e.g. sodium or mercury vapor), electroluminescent, light-emitting diodes (LED), laser, vacuum fluorescent etc. The artificial lighting may be placed in front of or behind the instrument display 14. The intensity of the artificial lighting may be selectively controlled by a manually adjustable rheostat or potentiometer and/or automatically by a photosensor, which can detect the ambient lighting conditions and thereafter increase or decrease the intensity of the artificial lighting 13 if the ambient lighting conditions warrant.

As best seen in FIG. 1 the instrument 14 is fixed on a dashboard 15 which may be control panel, instrument panel, or framework which holds or supports the instrument display 14 and the artificial lights 13 in predetermined positions relative to the windshield 10. This conceivably may be the same dashboard configuration which was originally designed for displaying the instrument indicators directly in the line of sight of the observer 11 or may be supplemental thereto. Further the invention may display visual data indicia on the enhancing film or predetermined tint field totally independent of any instrument indicators which may appear in other locations on the dashboard.

A reflection including both a primary and a secondary, or ghost image from the instrument indicators 14 which appear in the observers 11 line of sight 16A, as displayed on the innermost facing surface of the windscreen 10, and in the enhancing film or predetermined tint field 12 are displayed in such a position relative to the line of sight 16A of the observer 11 such that the observer does not need to shift his vision appreciably when reading the instrument indicators 14 which are selected for the heads up display, while the operator simultaneously looks forward beyond the front of the vehicle to the environment surrounding the vehicle.

Figure 3:
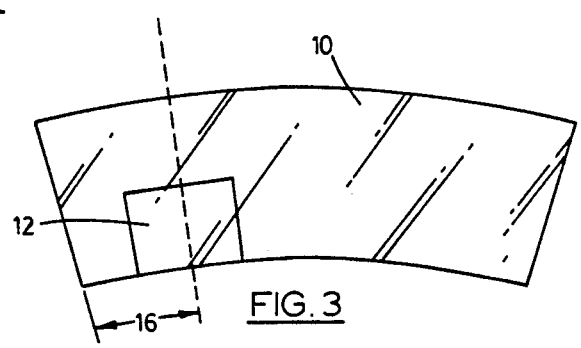
FIG. 3 is a partial, schematic, front elevational view of the windscreen having a predetermined tint field of the present invention.

Thus, and as best seen by reference to FIG. 3, the area of the enhancing film or predetermined tint field 12 ma be much smaller than the total area of the windscreen 10 provided it is disposed in such a position that it covers the area through which the operator normally views the environment which is immediately ahead of the vehicle when it is moving forwardly. The position of the predetermined tint field 12 is substantially in alignment with the operator 11 as he is positioned in the driver's seat. Understandably, this would be reversed in those countries where the steering wheel is on the right hand side of the car. Further it should be understood that this predetermined tint field can also be duplicated on the right hand portion of the windscreen 10 as in the case of aircraft where both the pilot and co-pilot can take advantage of this invention. Furthermore, the entire windscreen can be provided with the present invention so that the entire surface thereof is enhanced thereby providing the benefits which were discussed earlier.

Although I have illustrated a human being 11 as the observer or operator of the vehicle which includes the present invention, and who employs his own vision as the detector of the visual display produced by the invention, on the windscreen, it is to be understood that any remotely controlled device for recording and/or transmitting visual information, such as a camera, video recorder, a television camera, etc., not shown, can be remotely located in the position of the operator 11 as illustrated in FIG. 1. This may be particularly critical for the operation of devices such as drone aircraft or other overland vehicles which have no human operators but which are remotely controlled.

As earlier discussed and as shown in FIG. 1, I have illustrated how ambient light 18 which originates from the environment outside the vehicle passes through the windscreen 10 and thereafter directly illuminates the instrument indicators 14 as well as the observer 11. This ambient lighting intensity determines the artificial light required to be supplied by the artificial lighting 13 to produce a readable primary reflected image in the enhancing film or predetermined tint field 12. Under bright lighting conditions it is possible that no artificial lighting may be necessary for particular types of instrument clusters, particularly analog displays which include a reflective display face and a movable needle assembly, the instrument placed in a fashion wherein the ambient exterior light may be reflected off of the face thereof and onto the predetermined tint field.

All the foregoing provides the image of the various instruments or dials etc. 14 on the enhancing film or predetermined tilt field 12 while yet permitting clear and unobstructed view of the environment 19 directly in the line of sight 16A of the operator or viewer 11.

Figure 2:
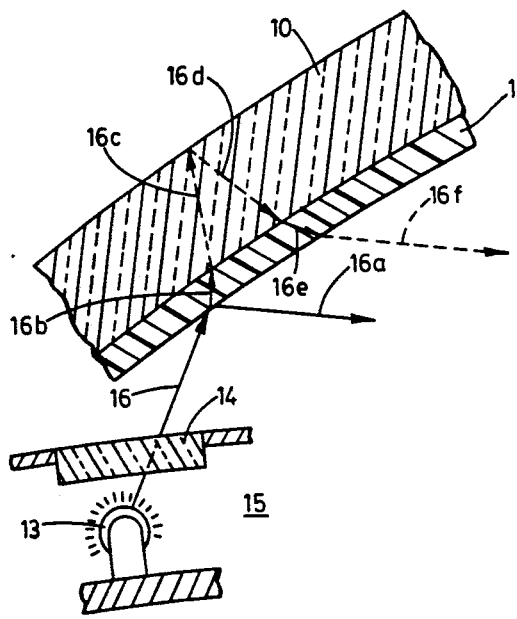
FIG. 2 is a fragmentary, greatly enlarged, diagrammatical illustration of the effect of the "multipathing" or "ghosting" of the reflected image and which is substantially avoided by the present invention.

As best shown by reference to FIG. 2 I have illustrated the "multipathing" or "ghost effect" which the present invention is adapted to substantially eliminate and which can occur when an image or ray of light which is emitted from the instrument 14 passes through a windscreen 10. Under these conditions, the primary or desired image 16 is reflected off the surface nearest to the observer 11 and along the line of sight 16A (in this case the interface between the air and the predetermined tint field 12 which has been applied to the interior surface of the windscreen 10 or made integral with this composition). One of the infinite number of secondary reflections which can occur in such an optical arrangement is shown at numeral 16F and represents the "ghost" which is most troublesome because of its intensity and its virtual separation from the line of sight 16A. Such ghosts tend to clutter or otherwise obscure the primary image such that the precise details of the image may not be discerned without difficulty. Further, other secondary reflections or ghosts may be weak or so near to the line of sight 16A such as to be undetectable or indiscernible.

One of the principle objects of the enhancing film or predetermined tint field 12 is to improve the primary image which is seen along the line of sight 16A and to diminish or eliminate the secondary reflections or ghosts 16F to such a state where it is virtually undetectable and/or the "ghost" is eliminated with the result that only one primary image is perceived by the observer 11.

To substantially eliminate or materially diminish the secondary reflections or "ghosts" 16F, the enhancing film or predetermined tint field 12 contains orange/red "blockers" so that when the orange/red light waves pass through the enhancing film or predetermined tint field as at 16B, they are substantially absorbed by the tint field, and therefore any orange/red light waves passing therebetween as at 16C and reflected from the outer surface of the windscreen 10 along the path 16D, are further absorbed when passing through the tint field at 16E, and thus substantially no orange/red light waves are reflected to the eye of the observer 11 forming the "ghost" 16F. If any lightwaves do succeed in making this transition, they are virtually undetectable and, therefore, no "ghost" images are created.

In addition to the foregoing, federal law mandates that windscreens be designed to transmit at least 70% of the visible light spectrum. In order to comply with the provisions of law, the tint field 12 is designed to substantially and selectively attenuate or absorb only those wavelengths of light reflected or emitted by the instrument 14. More particularly, it has been discovered that upon achieving the selective transmission or reflection of light in the predetermined frequencies, the tint field can be adapted to attenuate just those frequencies such that the average visible spectrum transmission of the windshield 10 is not reduced below the 70% requirement as mandated by federal law. As discussed above, the applicant has selected orange/red blockers for the tint field, which are adapted to absorb a high percentage of light produced in the orange/red band which resides at 625-700 nanometers.

As should be understood, a two-fold benefit is achieved by matching the peak reflected or emitted frequencies of light produced by the instrument 14 with a predetermined tint field 12. The primary benefit as discussed above is to reduce substantially the intensity of the secondary reflected or "ghost" image. This affect is achieved by the invention because light passing through the windscreen 10 and which causes the "ghost" passes through the predetermined tint field on two occasions. On each occasion the "ghost" is weakened to such an extent that it becomes barely perceptible in relative comparison to the primary image by the time that it emerges in the operators 11 line of sight 16A. Further and in addition to the foregoing, the secondary benefit of the tint field is to increase the primary image contrast relative to the ambient background light by reducing the amount of in-band light which is readily apparent in the background. In the present instance, colors in the red/orange band have been selected, however this same concept can be applied to virtually any color.

Figure 4:
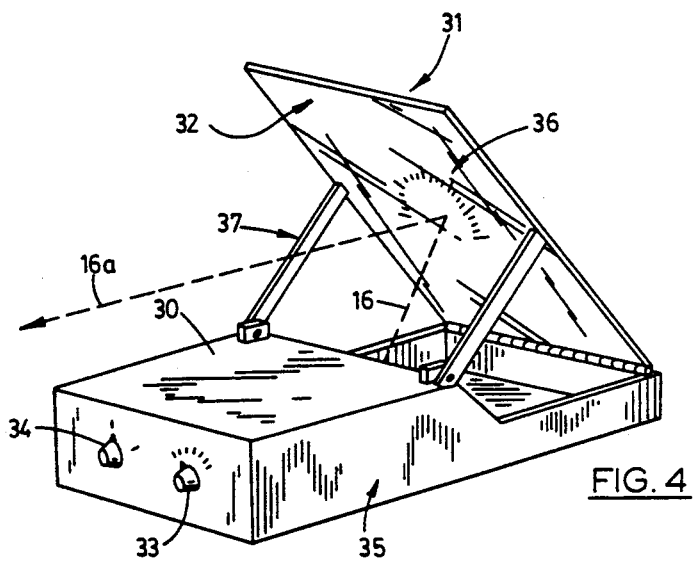
FIG. 4 is an illustration of a portable demonstration device of the present invention.

At FIG. 4 I have illustrated one form of a portable device 30 which demonstrates the principles of the present invention. The portable devices is approximately 24 inches long by 12 inches wide and 18 inches high and consists of a piece of laminated safety glass 31 with an attached enhancing film 32. This combination is supported by a box frame in a manner approximating the rake of an automobile windshield with a dashboard underneath. Also supported by the frame is a speedometer display face (not shown) and which casts the "heads ups display" image 36 along line 16, to be reflected from the film 32 along path 16A which represents the line of sight of the observer. Internal lighting is supplied by twin quartz halogen bulbs (also not shown). The power to augment the lighting is supplied when the on/off switch 34 is turned on. A rheostat 33 allows manual intensity control to suit the background lighting in contrast in the environment. The windscreen 31 and the film 31 may be removed from the support 35 by unbolting the brackets and supports 37.

In the present invention, one aspect which distinguishes the structure from the prior art disclosures (as for instance the disclosure shown in Tustison, U.S. Pat. No. 4,794,053) is that the enhancing film or predetermined tint field 12 includes specific "blockers or absorbers of certain optical wavelengths or frequencies and, more specifically, an absorber of the orange/red light waves (625 14 700 nanometers). If other colors are to be blocked or absorbed, the wavelengths of the emitted or reflected lights 16 is substantially matched to the absorbing band of the enhancing film or predetermined tint field 12. This enhancing film as earlier discussed may be placed, either on the inside surface (the operator side) of the windscreen 10, laminated between two separate layers of the windscreen 10 as in the nature of safety glass so that it is between the inner and outer surfaces of the windscreen, or made integral with the composition which makes up the windscreen. Although conceivably it could be positioned on the outside facing surface of the windscreen, this would not be desirable because it would be abraded by sand, dirt, oil, snow, etc., which impinges against the outside of the windscreen as the vehicle moves forward. The most desirable place for the predetermined tint field 12 is within the windscreen or alternatively to be made integral with the composition thereof because, when it is placed on the inner facing surface of the windscreen, there is a likelihood that the enhancing film or predetermined tint field may be abraded when the windscreen is cleaned.

Figure 5:
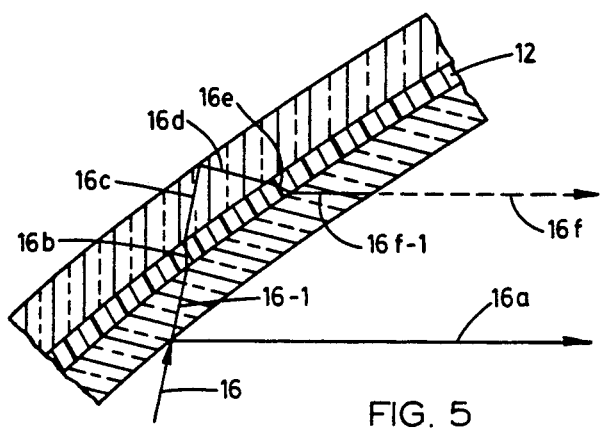
FIG. 5 is a fragmentary, greatly enlarged, diagrammatical illustration similar to FIG. 2 and which illustrates the predetermined tint field located between two lamina of the windshield.

In accordance with the teachings noted above, I have shown at FIG. 5 a cross-section of the windscreen wherein the enhancing film or predetermined tint field 12 is placed between the inner and outer surfaces thereof. This illustrates how the reflected red/orange light waves which form the primary image and which is seen along the line of sight 16A is seen by the driver 11, but any light which passes through the inner lamina 16-1 is absorbed at 16B by the enhancing film 12, and therefore, any continuing image (if any) which passes through the outer lamina at 16C and reflected by the surface thereof along the path 16D, is further and once again absorbed by the red/orange "blockers" of the enhancing film or predetermined tint field at 16E. Any light which passes through the inner lamina at 16F-1 toward the observer and which forms the "ghost" 16F is either so minimal as to be incapable of creating a "ghost" or is virtually undetectable.

The elimination of the "ghosting image" is particularly critical in the more recent model automobiles where a 28° rake of the windscreen (i.e., the angle between the slope of the windscreen and the line of vision of the driver) is fairly severe and tends to exaggerate or increase the ghosting image problem.

Figure 6:
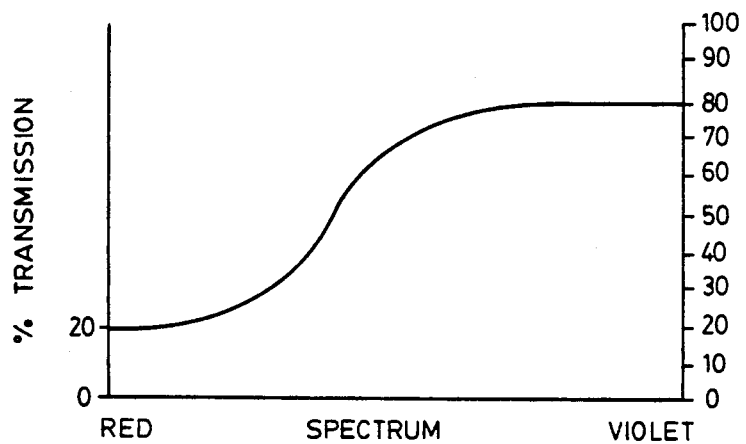
FIG. 6 is a graphic illustration of the lightwave absorbing features of the tint field which is made integral with the windshield.

The positioning of the enhancing film or predetermined tint field in the use of the orange/red "blockers" is also illustrated at FIG. 6 which is a graphic illustration which shows that 80% or more of the orange/red frequencies are absorbed by the enhancing film or predetermined tint field on the initial pass through the tint field as well as the reflected pass through the tint field 12.

Figure 7:
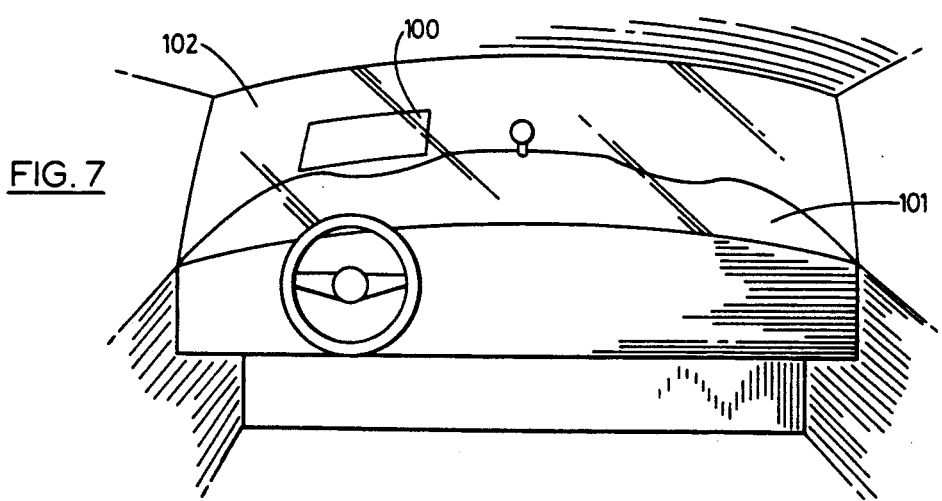
FIG. 7 illustrates the appearance from the interior of the vehicle of the predetermined tint field on the windscreen.

FIG. 7 further illustrates the use of the enhancing film or predetermined tint field in the windscreen 10, where the small patch 100 appears in the drivers line of vision while the operator looks through the windscreen toward the road ahead. The slope of the hood 101 of the automobile mandates that the enhancing film be placed high enough in the windscreen s that the driver's line of vision passes through the enhancing film above the surface of the hood, and beyond to the road ahead.

It can also be seen by reference to FIG. 7 that the enhancing film or predetermined tint field does not, of necessity, have to extend all the way to the upper edge 102 of the windscreen, nor very far to either the right or left because the operator 11 of the vehicle when driving at customary road speeds, looks straight ahead, and not to the right or left when interested in knowing what vital information is projected by the present apparatus, on the enhancing film or predetermined tint field. However, the enhancing film or predetermined tint field area must be large enough to accommodate operators of all sizes, that is, the line of vision of a smaller person sitting in the drivers seat (which dimension determines the location of the lower edge of the enhancing film or predetermined tint field) as well as a tall person sitting in a driver's seat, which dimension determines the location of the upper edge of the enhancing film or predetermined tint field.

It is furthermore to be understood that my present invention may be embodied in other specific forms without departing from the spirit or special attributes thereof; and it is therefore, desirable that the present embodiments be considered in all respects as illustrative and, therefore, not restrictive, reference being made to the appended claims rather than to the foregoing description to indicate the scope of the invention.

Having thus described my invention, what I claim as new and desire to protect by letter patent are the following:

1. An instrument display apparatus comprising:
   a transparent sheet,
   a thin transparent enhancing film made integral with the transparent sheet and which is operable to attenuate preselected wavelengths of light which strike the enhancing film and which originate from all directions, the enhancing film providing unrestricted viewing through the transparent sheet in all directions; and
   an instrument to be displayed disposed in proximity to the enhancing film and which is adapted to produce light in the selected wavelengths which are attenuated by the enhancing film whereby the image of the instrument appears in the enhancing film, and wherein the enhancing film further attenuates the selected wavelengths of light which originate from locations other than the instrument whereby the contrast of the image appearing in the enhancing film is improved relative to the background ambient lighting conditions.

2. An instrument display apparatus as claimed in claim 1 and wherein the transparent sheet is a windshield of a vehicle.

3. An instrument display apparatus as claimed in claim 2 and wherein the instrument displayed is an instrument cluster in the vehicle which is disposed in a selective position so that the characteristics of the instrument cluster will be reflected from the enhancing film toward an occupant of the vehicle.

4. An instrument display apparatus as claimed in claim 2 and wherein the enhancing film is made integral with that surface of the windshield which is on the interior of the vehicle.

5. An instrument display apparatus as claimed in claim 4 and wherein the enhancing film is a thin sheet which is secured on the windshield.

6. An instrument display apparatus as claimed in claim 4 and wherein the enhancing film is a coating applied on the windshield.

7. An instrument display apparatus as claimed in claim 4 and wherein the enhancing film is made integral with the material forming the windshield and wherein the enhancing film produces primary and secondary reflections of the instrument cluster and wherein the primary reflection is more powerful than any secondary reflection.

8. An instrument display apparatus as claimed in claim 4 and wherein the instrument cluster includes an auxiliary lighting system.

9. An instrument display apparatus as claimed in claim 8 and wherein the instrument cluster is mounted on a dashboard of the vehicle.

10. An instrument display apparatus as claimed in claim 4 and wherein the enhancing film and the windshield are coextensive.

11. An instrument display apparatus as claimed in claim 4 and wherein the enhancing film is smaller in area than the area of the windshield.

12. An instrument display apparatus comprising:
    a substantially transparent panel having a predetermined tint field which attenuates preselected wavelengths of light, and which provides unrestricted viewing in all directions, the tint field attenuating the preselected wavelengths of light which strike the transparent panel from all directions, and
    an instrument to be displayed positioned adjacent to the transparent panel and which is adapted to produce light in the select wavelengths, and wherein the instrument produces primary and secondary reflected images in the transparent panel, and wherein the primary reflected image is reflected by the transparent panel and wherein the secondary reflected image is attenuated by the tint field whereby the primary reflected image of the instrument appears within transparent panel.

13. An instrument display apparatus as claimed in claim 12 and wherein the transparent panel is a windscreen borne by an overload vehicle which includes a passenger compartment and an operator's position, and wherein the tint field is located substantially within the line of sight of an operator who is located in the operator's position such that the operator may see the primary reflected image of the instrument while viewing through the windscreen without substantially diverting his vision, and wherein the primary reflected image of the instrument can further be seen from all locations in the passenger compartment.

14. An instrument display apparatus as claimed in claim 13 and wherein the instrument emits or reflects visible light substantially in a predetermined nanometer band, and wherein the tint field selectively attenuates the light which is emitted or reflected from the instrument in the predetermined nanometer band and which forms the second reflected image, and wherein the tint field further attenuates the light in the predetermined nanometer band which originates from locations other than the instrument whereby the contrast of the primary reflected image appearing in the windscreen and within the line of sight of the operator is enhanced relative to the background ambient lighting conditions.

15. An instrument display apparatus as claimed in claim 12 and wherein the tint field includes a synthetic polymer sheet secured on the transparent panel.

16. An instrument display apparatus as claimed in claim 12 and wherein the tint field includes a coating applied on the inside surface of the transparent panel.

17. An instrument display apparatus as claimed in claim 12 and wherein the tint filed is made integral with the material which composes the transparent panel.

18. An instrument display apparatus as claimed in claim 12 and wherein the transparent panel is laminated safety glass and the tint field is made integral with a transparent sheet which is secured between the two inner facing surfaces of the laminated safety glass.

19. An instrument display apparatus as claimed in claim 14 and wherein the instrument emits or reflects light in the 625-700 nanometer band.

20. An instrument display apparatus as claimed in claim 19 and wherein the vehicle has a dashboard and wherein the instrument is surmounted on the dashboard and is illuminated by ambient natural light, and wherein a means for artificially illuminating the instrument is borne by the vehicle and is operable to provide illumination for the instrument whereby the primary reflected image of the instrument appears within the windscreen in the absence of predetermined levels of ambient natural light.

21. An instrument display apparatus for use by an operator who has a line of sight comprising:
a transparent panel,
a predetermined tint field made integral with the transparent panel and which provides the operator with unrestricted viewing in all directions and which is operable to attenuate preselected wavelengths of light which strike the predetermined tint field from all directions; and
an instrument to be displayed disposed in a position adjacent to the transparent panel and which is operable to produce light in the predetermined wavelengths attenuated by the tint field, and wherein the instrument produces a primary and a secondary reflected image in the transparent panel, and wherein the primary reflected image is reflected by the transparent panel and is substantially unaffected by the tint field and is viewed by the operator along the line of sight, and wherein the secondary reflected image is attenuated by the tint field whereby it is substantially weakened or eliminated, and wherein the tint field is operable to attenuate the predetermined wavelengths of light which originate from locations other than the instrument whereby the contrast of the primary reflected image is improved relative to the background lighting conditions.

22. An instrument display apparatus as claimed in claim 21 and wherein the instrument includes artificial lighting means which is operable to cause the instrument to emit light in the predetermined wavelengths.

23. An apparatus as claimed in claim 21 and wherein the instrument is operable to reflect ambient natural light in the predetermined wavelengths.

* * * * *

UNITED STATES PATENT AND TRADEMARK OFFICE
CERTIFICATE OF CORRECTION

PATENT NO. : 5,005,009
DATED : April 2, 1991
INVENTOR(S) : John K. Roberts

It is certified that error appears in the above-identified patent and that said Letters Patent is hereby corrected as shown below:

Column 4, Line 6, after "conceivably" insert -- a --;

Column 5, Line 53, cancel the first occurrence of the letters "ma" and insert the word -- may --;

Column 8, Line 11, cancel "(62514 700 nanometers)" and insert -- (625 - 700 nanometers)--.

Signed and Sealed this

Eighteenth Day of August, 1992

Attest:

DOUGLAS B. COMER

*Attesting Officer*    *Acting Commissioner of Patents and Trademarks*